United States Patent [19]

Trotignon

[11] Patent Number: 5,028,466
[45] Date of Patent: Jul. 2, 1991

[54] EXTRUDER FOR CONTINUOUSLY EXTRUDING A WALL HAVING A THREE-DIMENSIONAL CELLULAR STRUCTURE, AND A CELLULAR WALL PROVIDED THEREBY

[76] Inventor: Jean-Pierre Trotignon, 13 La Roseraie - 114 Avenue de Paris, 78000 Versailles, France

[21] Appl. No.: 428,039

[22] Filed: Oct. 26, 1989

[63] Continuation of Ser. No. 141,305, filed as PCT FR87/00097 on Mar. 27, 1987, published as WO87/06181 on Oct. 22, 1987.

[30] Foreign Application Priority Data

Apr. 1, 1986 [FR] France .................. 86 05216

[51] Int. Cl.[5] ................................ B32B 3/12
[52] U.S. Cl. .................. 428/36.91; 264/40.7; 264/167; 428/116
[58] Field of Search .............. 428/116, 118, 73, 36.91; 264/167, 40.7

[56] References Cited

U.S. PATENT DOCUMENTS

| 1,993,790 | 3/1935 | Kinsella | 264/40.7 |
|---|---|---|---|
| 3,247,039 | 4/1966 | Schultheiss | 156/167 |
| 3,256,563 | 6/1966 | Criss et al. | 425/466 |
| 3,283,364 | 11/1966 | Martin et al. | 425/382 N |
| 3,349,434 | 10/1967 | Hureau | 425/382 N |
| 3,551,543 | 12/1970 | Mercer et al. | 264/167 |
| 3,562,046 | 2/1971 | Guy | 264/167 |
| 3,562,825 | 2/1971 | Larsen | 264/DIG. 81 |
| 3,810,800 | 5/1974 | Doll | 156/78 |
| 3,844,874 | 10/1974 | Nalle, Jr. | 264/DIG. 81 |
| 3,874,969 | 4/1975 | Hureau et al. | 156/167 |
| 3,932,090 | 1/1976 | Brumlik | 425/381 |
| 4,059,713 | 11/1977 | Mercer | 428/107 |
| 4,419,315 | 12/1983 | Kessler | 264/145 |
| 4,612,225 | 9/1986 | Graffam et al. | 428/116 |
| 4,642,040 | 2/1987 | Fox | 425/204 |
| 4,656,075 | 4/1987 | Mudge | 428/110 |

FOREIGN PATENT DOCUMENTS

| 159971 | 8/1903 | Fed. Rep. of Germany . |
|---|---|---|
| 1109131 | 6/1961 | Fed. Rep. of Germany ... 264/DIG. 81 |
| 1215917 | 5/1966 | Fed. Rep. of Germany . |
| 2527787 | 1/1976 | Fed. Rep. of Germany . |
| 1555590 | 1/1969 | France . |
| 2177457 | 11/1973 | France .................. 264/DIG. 81 |
| 47-47095 | 11/1972 | Japan ........................ 264/167 |
| 52-7023 | 2/1977 | Japan ........................ 264/167 |
| 1231456 | 5/1971 | United Kingdom . |

Primary Examiner—James J. Seidleck
Attorney, Agent, or Firm—Sixbey, Friedman, Leedom & Ferguson

[57] ABSTRACT

An extruder in accordance with the invention comprises a die (1) having an opening (2) in the form of an uninterrupted section constituting a frieze of rectilinear or curved segments that meet one another, and a mask (3) driven in reciprocating sliding motion over the die (1) and including a window which overlaps a varying portion of the section (2) as the mask moves.

16 Claims, 4 Drawing Sheets

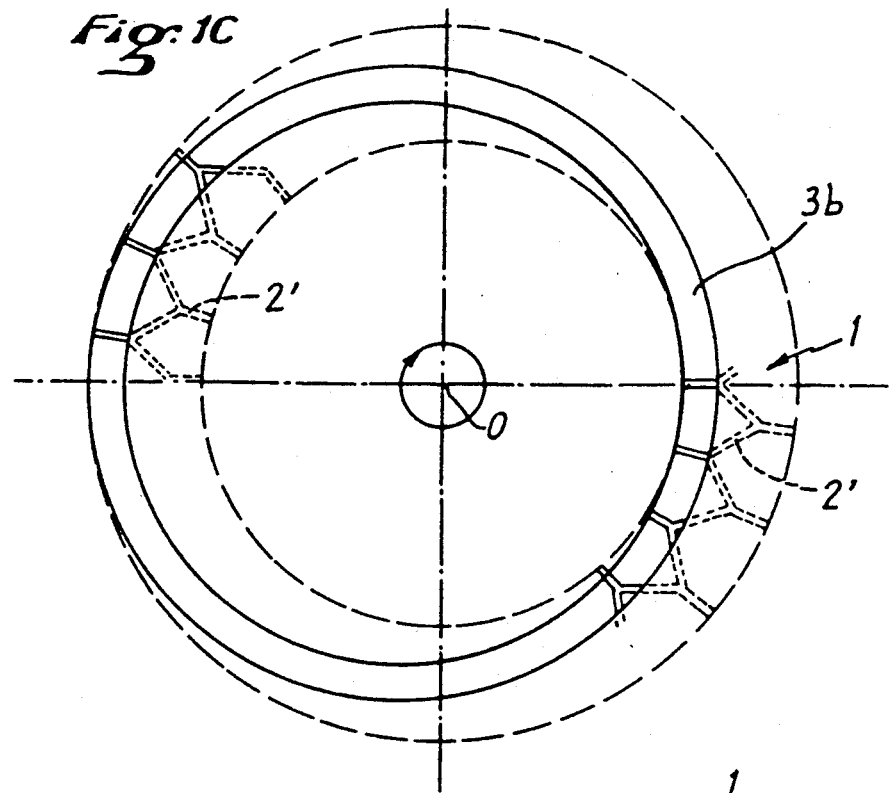
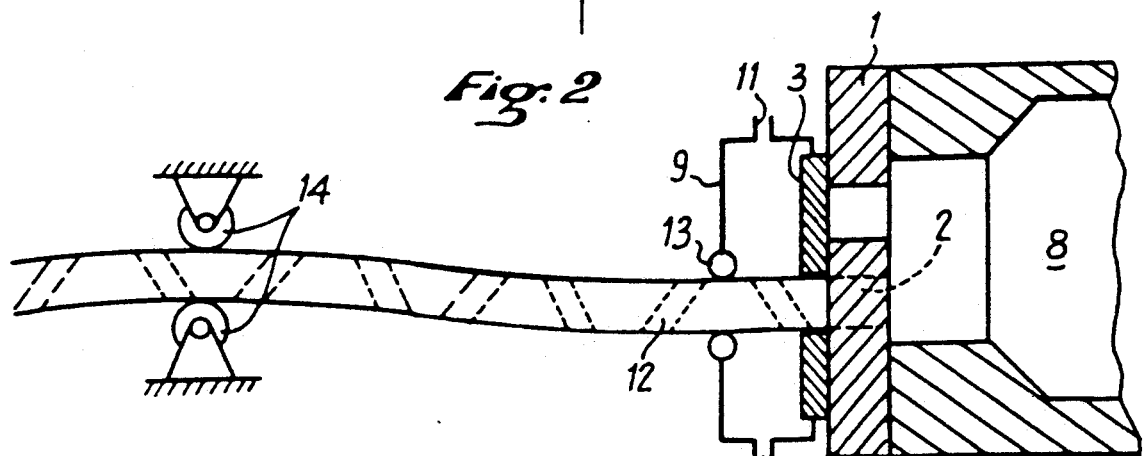
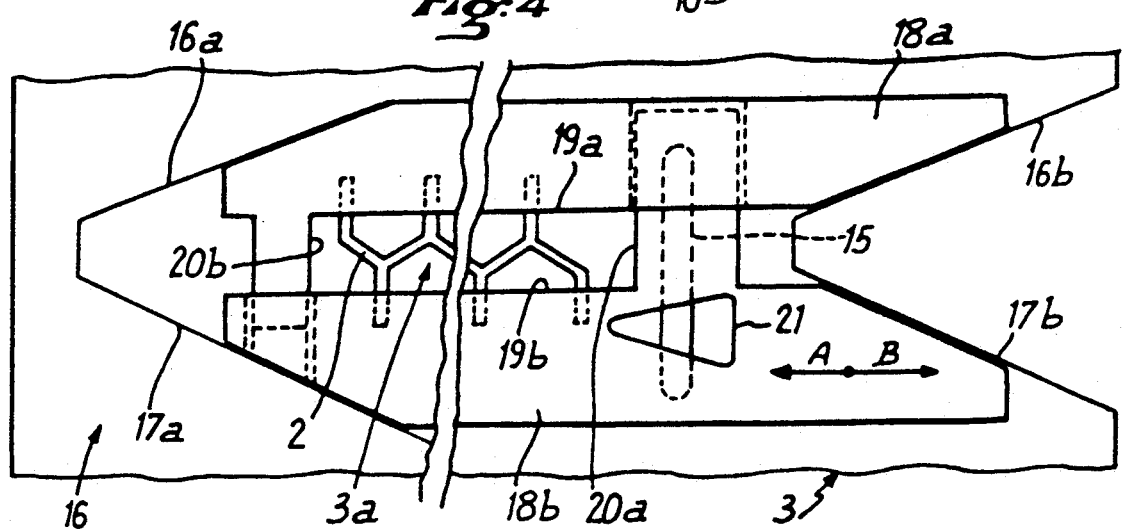

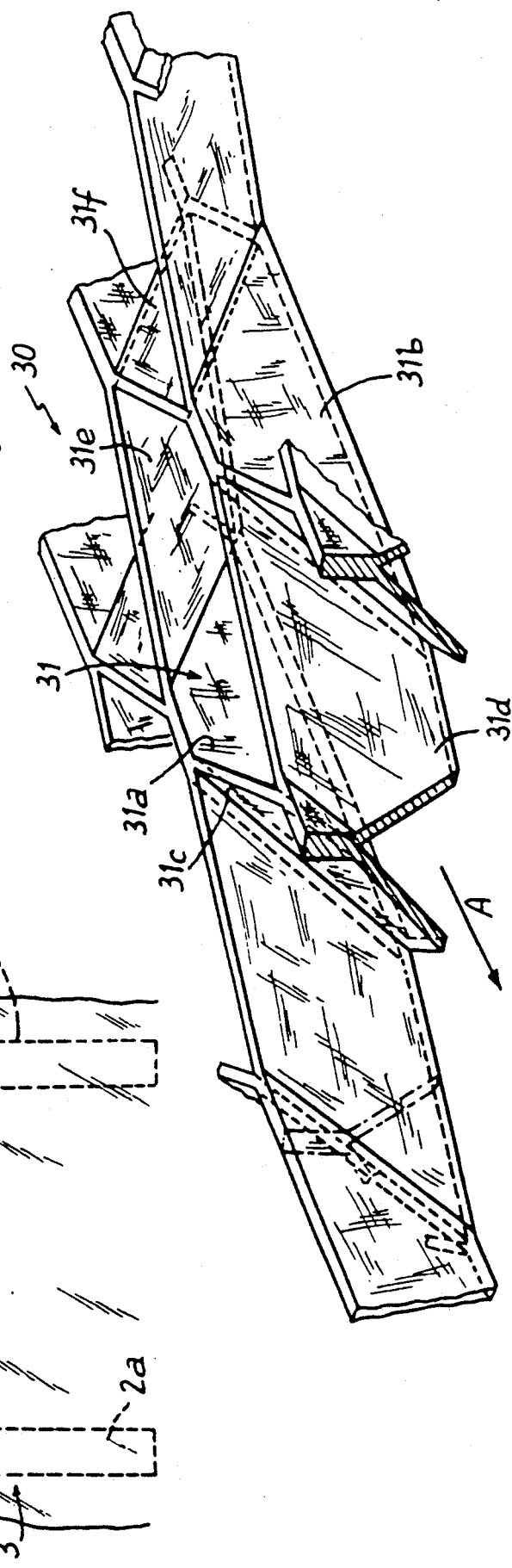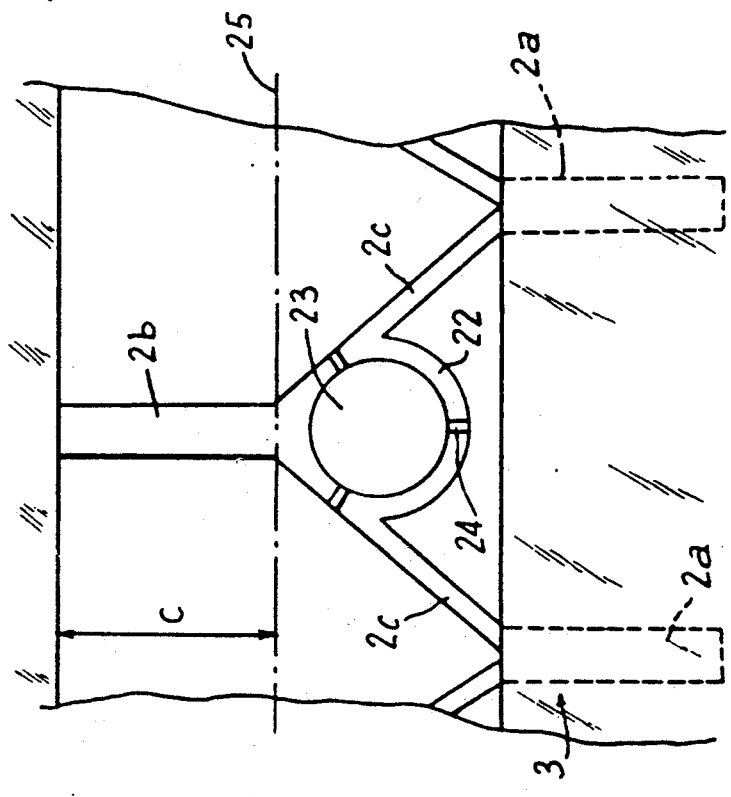

EXTRUDER FOR CONTINUOUSLY EXTRUDING A WALL HAVING A THREE-DIMENSIONAL CELLULAR STRUCTURE, AND A CELLULAR WALL PROVIDED THEREBY

This application is a continuation of Ser. No. 07/14,305, filed as PCT FR87/00097 on Mar. 27, 1987 published as WO87/06181 on Oct. 22, 1987, now abandoned.

Cellular structures, some of which are honeycomb in shape, are used mainly as cores or reinforcement in the manufacture of panels, or plane or shaped or tubular walls, etc.

Such a structure imprisoned between two thin and hard plates forming the faces of the wall has excellent rigidity and low weight.

There are several manufacturing techniques for obtaining a honeycomb cellular material. One of these techniques consists in stacking a plurality of thin sheets and in gluing them together along lines which are staggered from one sheet to the next, and then in expanding the stack by applying traction perpendicularly to the planes of the sheets. The resulting body obtained by expanding the stack has numerous parallel tubular channels. By suitably slicing the body perpendicularly to the longitudinal direction of the channels it is possible to obtain plates of desired thickness which can then be used as panel cores by covering each of their sliced faces with a respective facing sheet. This method of manufacture by deformation is used to provide honeycombs from metal sheets or from plastic sheets.

In the special case of plastic material, the cellular body may be obtained by extrusion through a die constituted by a wall having openings at the spacing existing between fixed cores. The extruded substance flows between the interstices and leaves the die in the form of a parallel tubular mesh which is immediately cooled and hardened in order to retain its shape. Cooling is generally obtained by a flow of water along the tubular mesh from ducts opening out into the outlet faces of the cores. The section of the tubular mesh formed in this way is necessarily small because of the limits on the possible area of the die and because of the very complexity of such a die (see published French patent application No. 2 493 219). As a result, the plates obtained by slicing this tubular mesh are small in size. It is then necessary to assemble such plates side by side by gluing or welding in order to enable them to be subsequently used as the core of a panel.

In either case, the numerous partitions of the cellular structure are perpendicular to the skin plates which are applied thereto. The panel assembly constituted in this way is strong in bending and in compression, particularly when the compression is perpendicular to its faces.

However, such panels have poor performance in shear, and the cellular structure can easily be flattened.

Methods of manufacturing cellular structure known here-to-fore are unsuitable for continuous mass production and thus low cost price. It has always been necessary to take the extruded product and to place the cells in the final product at an orientation perpendicular to the direction in which they were extruded.

The present invention seeks to solve the problem of extruding a mesh of cells whose axes are perpendicular to the extrusion direction.

This problem is solved according to the present invention by providing an extruder for extruding a cellular wall and including two elements which, in operation, slide relative to each other in periodic motion along a surface intersecting the exit direction of the extruded substance, one of said elements being constituted by a die provided with a substance-passing opening including at least one slot in the form of a zig-zag line, and the other one of said elements being a mask provided with a window uncovering a portion of said opening between the closest facing pair of window edges. According to an essential characteristic of the invention, the substance exit direction is parallel to a straight line, and the dimension of the window measured between said facing edges is greater than the greatest width of the slot by an order of magnitude. It is thus possible to continuously obtain a wall having a three-dimensional cellular structure with the axes of the cells extending perpendicularly to the direction of substance extrusion.

In a preferred embodiment of the invention, the substance-passing opening includes substantially parallel slot segments disposed at respective vertices of said zig-zag line slot.

In order to manufacture plates said window is substantially rectangular, and the periodic motion of the mask is reciprocating sliding motion perpendicular to the long sides of the window. If the rectangle is curved, at least along its long sides, the resulting wall will be bent, for example it may constitute a portion of a cylinder.

In order to manufacture tubes said window is annular, and the periodic motion of the mask is eccentric rotary sliding motion about the axis of symmetry of the opening through the die.

The shape of the window is not limited. It may be corrugated or it may be a succession of different sections (trapeziums, omegas, . . . ) enabling walls of all kinds of shape to be obtained.

In order to be able to adjust at least some of the dimensions of the cells, for a given extrusion throughput, the speed of reciprocating sliding of the mask may be adjustable.

In addition, in order to obtained plates of different thicknesses, or a late of varying thickness, the mask may be made of two portions which are separated from each other by an adjustable distance in order to delimit the window therebetween.

An extruder in accordance with the invention may also include various means for ensuring that the extrusion throughput remains constant regardless of the dimensions of the wall to be made or the thicknesses of the cell partitions that are to be obtained. Thus, the die may include an overflow orifice whose section is overlapped to a greater or lesser extent as a function of the width of said window.

Advantageously, the overlap may be constituted by a portion of the mask possessing an opening for this purpose which is of varying section and is disposed opposite said orifice in order to maintain the overall extrusion throughput at a constant value.

If the thicknesses of the partitions of each cell are not determined a priori as a function of the characteristics of the final product, the constant throughput through the die may be obtained, for a window of given dimensions, by the sum of the substance-passing sections within the limits of the window being constant regardless of the position of the window during its motion.

Otherwise, where there are constraints on the thicknesses to be provided for said partitions, constant throughput can be obtained during mask displacement by at least one flow rate compensating orifice provided through the die, with the section of the orifice varying inversely to the variation in the sum of the substance-passing sections within the window as the mask is displaced.

The extruder in accordance with the invention may also include at least one orifice through and distinct from the slots said orifice being disposed in such a manner as to remain within the window regardless of the position of the mask.

It may also include secondary dies whose substance outlet orifices are constituted by two slots which are parallel to each other, which are provided through the mask on either side of the window and in permanent communication with a fixed orifice through the die, and each of which is associated with a respective roll for pressing the respective strips coming from the slots while still in the semisoft state against the top and bottom surfaces of the cellular wall.

The invention also provides a three-dimensional cellular wall produced by extruding a semisoft substance through a die and allowing it to harden beyond the die, wherein each cell is delimited by a plurality of partitions extending substantially transversely to the thickness of the wall, and wherein at least two of the said partitions slope both relative to a direction normal to the faces of the wall and relative to the extrusion direction. The wall may be plane, curved, and of any ruled surface in the extension direction, or tubular.

The invention will be better understood from the following description given by way of purely non-limiting example and from which secondary advantages and characteristics can be seen.

Reference is made to the accompanying drawings, in which:

FIGS. 1A, 1B, and 1C are diagrammatic front views of three possible embodiments of an extruder in accordance with the invention;

FIG. 2 is a diagrammatic overall view of an extruder in accordance with the invention shown in section on line II—II of FIG. 1B;

FIG. 4 is a diagram showing a variant embodiment of an extruder in accordance with the invention including means for adjusting the thickness of the extruded product;

FIG. 5 is a diagram showing another variant extruder in accordance with the invention;

FIG. 7 is a fragmentary perspective view of a cellular structure product in the form of a plate and in accordance with the invention.

Figure 1A:
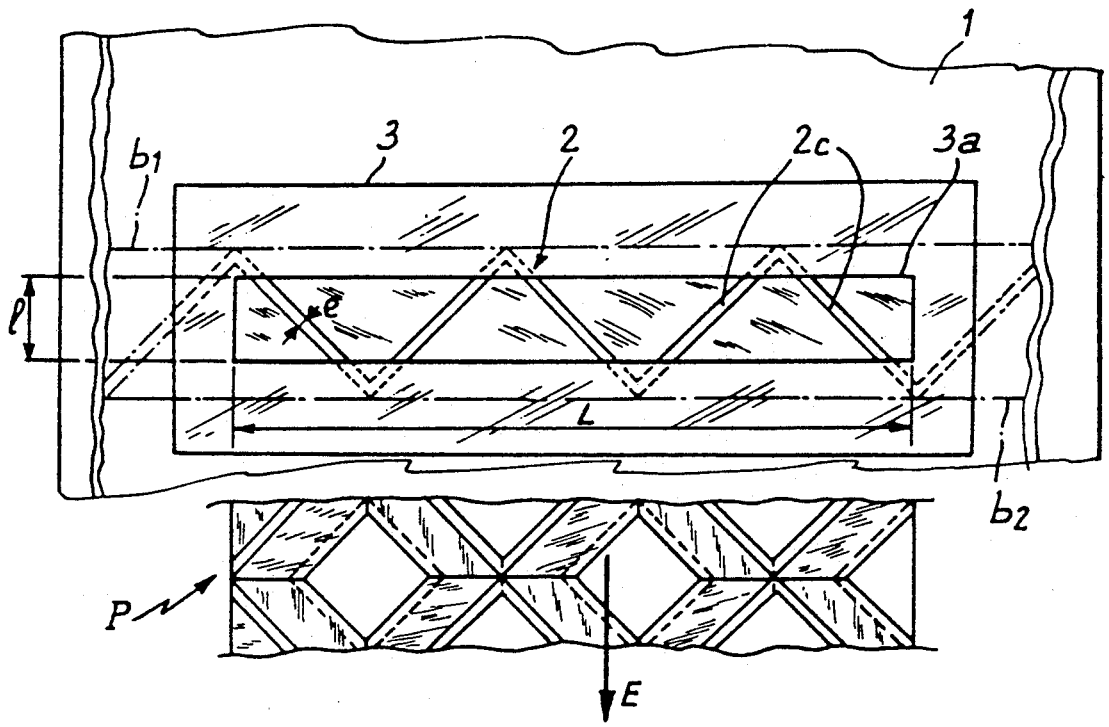
Figure 1B:
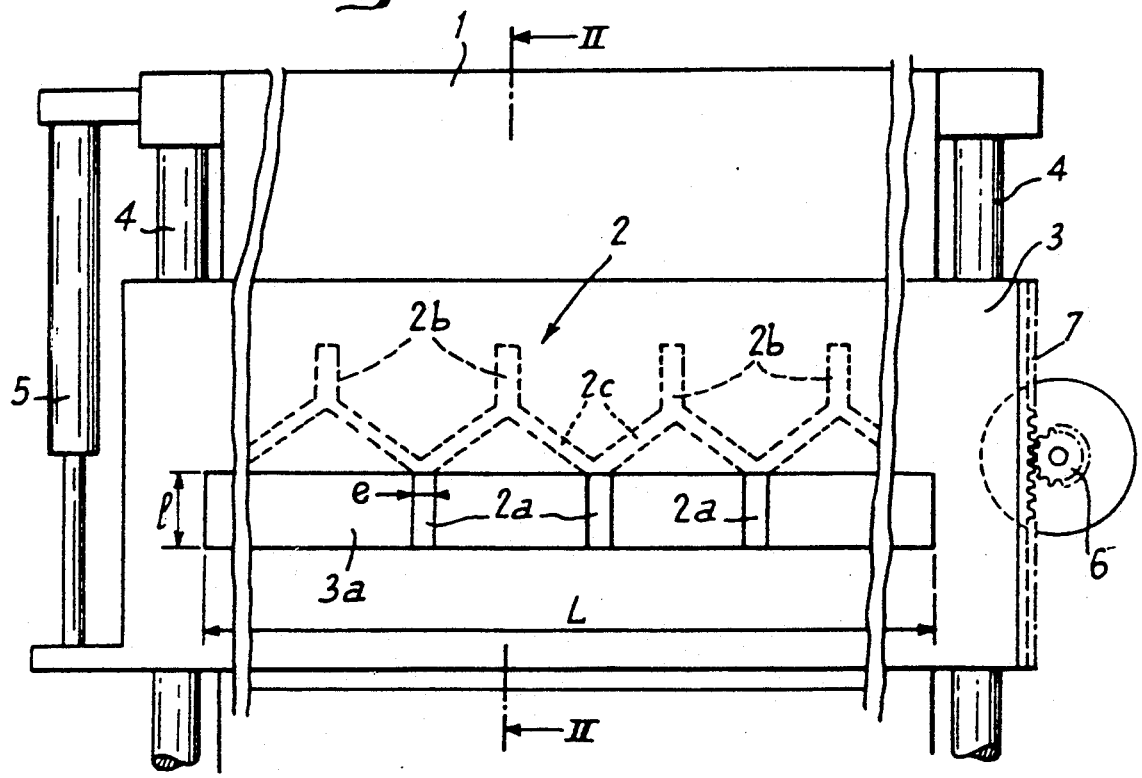

Reference is made initially to FIGS. 1A and 1B showing the front of a plate 1 constituting the die of an extruder and provided to this end with an opening for passing the extruded substance. The section of this opening perpendicular to the direction of movement of the substance being extruded is referenced 2.

In FIG. 1A, this section 2 is constituted by a slot in the form of a zig-zag line comprising successive sloping lengths of slot 2c defining top and bottom vertices therebetween.

In FIG. 1B, the section 2 is constituted by a plurality of parallel bottom slots 2a and a plurality of top slots 2b which are also parallel and which are offset in a horizontal direction relative to the slots 2a. Apart from the end slots, each of the bottom slots is connected by two sloping slots 2c to the top slots on either side thereof. The same is true for the connections between the top slots and the bottom slots.

Without going beyond the scope of the invention, other shapes can be devised for the section of the die orifice, and the shape shown is merely a non-limiting example. Thus, an opening may be provided having a section whose pattern constitutes a frieze of criss-crossing zig-zag lines, and each of the line segments constituting the pattern may be rectilinear or curved. Naturally, the plate 1 of the die may be assembled from a plurality of juxtaposed parts in order to construct the extrusion opening simply. In this special case where a portion of the wall is entirely surrounded by an opening by virtue of the pattern of the section for passing the substance, the portion may be held in place relative to the other portions of the wall adjacent thereto by any known means, such as narrow spacers extending across the substance-passing section, or by the fact that the core is fixed inside the die to a support which is fixed, in turn, to the die in a region where it does not impede the flow of extruded substance. It may be observed that regardless of the pattern of the substance-passing section, none of the portions of this section is isolated from the others in such a manner as to cause the area of the complete section to have any gaps therein.

The device includes a mask 3 disposed in front of the die 1 and suitable for sliding over the front face thereof, being guided in this sliding action along the columns 4. Reference 5 designates an actuator suitable for driving the mask 3 in reciprocating motion along the columns 4 over a determined and adjustable stroke. In a variant, instead of using an actuator 5, the drive may be provided by a device 6 including driving toothed wheel co-operating with a rack 7 fixed to the mask 3.

These figures do not show means for pressing the mask against the front face of the die over which it slides, e.g. pressure wheels or rolls, in order to seal the contact between the mask and the die.

The mask 3 is provided with a rectangular window 3a of length L and height l. The outlet opening 2 from the die is thus partially closed by the mask 3 which allows substance to pass through the window 3a only.

It should be observed that the dimension l of the window between its closest facing edges is considerably greater than the width e of the uncovered slots. This characteristic makes it possible that the substance is extruded in a direction parallel to a straight line, for example perpendicularly to the die, thereby providing the three-dimensional characteristic to the wall.

FIG. 1A includes a fragmentary plan view of the product P produced by the extrusion device as seen face-on in the figure.

During an extrusion operation, the mask is continuously reciprocated over the wall of the die while the substance is being extruded. It can thus be seen that the substance-passing section varies continuously in shape since, at any given instant, it is constituted by the intersection between the window 3a and the overall section 2 of the opening through the die. The envelope of this section remains constant and identical to the outline of the window 3a.

The extruded substance thus appears in the form of a plane plate of thickness l and of width L having a plurality of cell-delimiting partitions therein. An example of this product is shown in FIG. 7 and is described in greater detail below.

Another example of this product P is shown in a plan view in FIG. 1A separate from the extrusion head which is shown as a front view. This product is constituted by a succession of square-based tetrahedral cells and is obtained by the die 1 provided with the zig-zag line opening 2 and for which the speed of reciprocating displacement of the mask 3 in front of the die is assumed to be equal to the constant speed of substance extrusion. This assumption is over-idealized, not least because the speed of the mask cannot be kept to an absolutely constant value at the point where it changes direction. The scanning stroke of the window is shown as extending between two dot-dashed lines $b_1$ and $b_2$. The extrusion direction is represented on the product P by an arrow E. It is necessary for the direction of extrusion to be parallel to a straight line.

In addition to the initial pattern of the section 2, the shape of the cells depends on the portion of said section which is scanned by the window 3a as it moves, and also on the speed with which it moves, which speed may vary during a scan cycle (one go and one return stroke) and/or from one cycle to the next, and there may even be pauses between cycles or between each half-cycle. The figures show a rectangular window, but the invention covers any shape of window suitable for extruding the product of any desired section. For example, it may be advantageous to have a window in the form of an annular sector, thereby enabling a wall to be extruded having a section constituting a portion of a cylinder and intended to be used in making pre-shaped panels, in particular car tops. The window may be angled, being L-shaped, -shaped, or $\Omega$-shaped, etc., or any other shape capable of being extruded, with mask motion being adapted to the chosen shape (for example along the bisector of the angle of the L-shape). It should be observed that it may be advantageous to have a standard die with a network of slots over a sufficiently large area to enable the die to be scanned by masks having windows of different shapes. This provides tooling which is extremely cheap.

It may be observed that the above-mentioned cells are open to the top and bottom faces of the wall. A fluid can thus flow therethrough in the direction of the thickness of the plate, which is highly advantageous for obtaining proper cooling of the product after extrusion and for obtaining uniform cooling. However, by varying the length of the mask stroke, it is possible to obtain a fluid-proof product in which the cells are blind. In this case, cooling remains simple, and is obtained by blowing or projecting a suitable fluid onto each of the faces of the product.

FIG. 1C is a diagrammatic illustration of a device in accordance with the invention for extruding a cellular wall occupying an entire tube-shaped cylinder. The mask 3 has an annular window 3b which is moved eccentricly around the axis O of a die 1 whose opening 2' is in a slot in the form of an annular frieze built up from the same unit pattern as is used in FIG. 1B. It will readily be understood that the scanning movement is equivalent to the reciprocating motion of the mask shown in FIGS. 1A and 1B. This can be seen most clearly by observing the scan performed by a limited sector of the die. The eccentricity of the motion is defined as a function of the width of the die zone that is to be scanned. Implementing such a device requires the inner and outer portions of the mask 3 to be interconnected, in particular via the center of the die along an axis close to the axis O, thereby requiring the die itself to the annular.

The resulting cylindrical tube may naturally be circular in section, but it may also have any other closed shape, thereby producing a cylinder on a base of any desired shape. The motion of the mask should be adapted to the particular shape required.

FIG. 2 is a diagram showing a section of the embodiment of the device shown in FIG. 1B, and the plate 1 and the moving mask 3 can be seen in this figure. The extruder chamber 8 is filled with semisolid substance which is forced to flow through the opening 2 of the die 1 by conventional means such as a supply ram or screw. A cooling chamber 9 is disposed immediately adjacent the mask 3. Preferably, this chamber 9 moves together with the mask. It is filled with a cooling liquid capable of flowing from an inlet 10 to an outlet 11. The plate 12 of extruded product is extracted from the chamber 9 in the solid state by draw rolls 13 fixed to the chamber 9, and is then taken up by fixed rolls 14 which are far enough away from the rolls 13 to allow the plate to deform elastically to absorb the bending due to the oscillations of the mask 3 and the cooling chamber 9.

It may be desirable to place the extruded product between two thin plates in order to constitute a panel of the type mentioned in the introduction. Such plates may be applied by gluing or by remelting the surfaces which are brought into contact. They may also be co-extruded together with the product either through an additional die or else through a device similar to that shown diagrammatically in FIG. 3.

Figure 3:
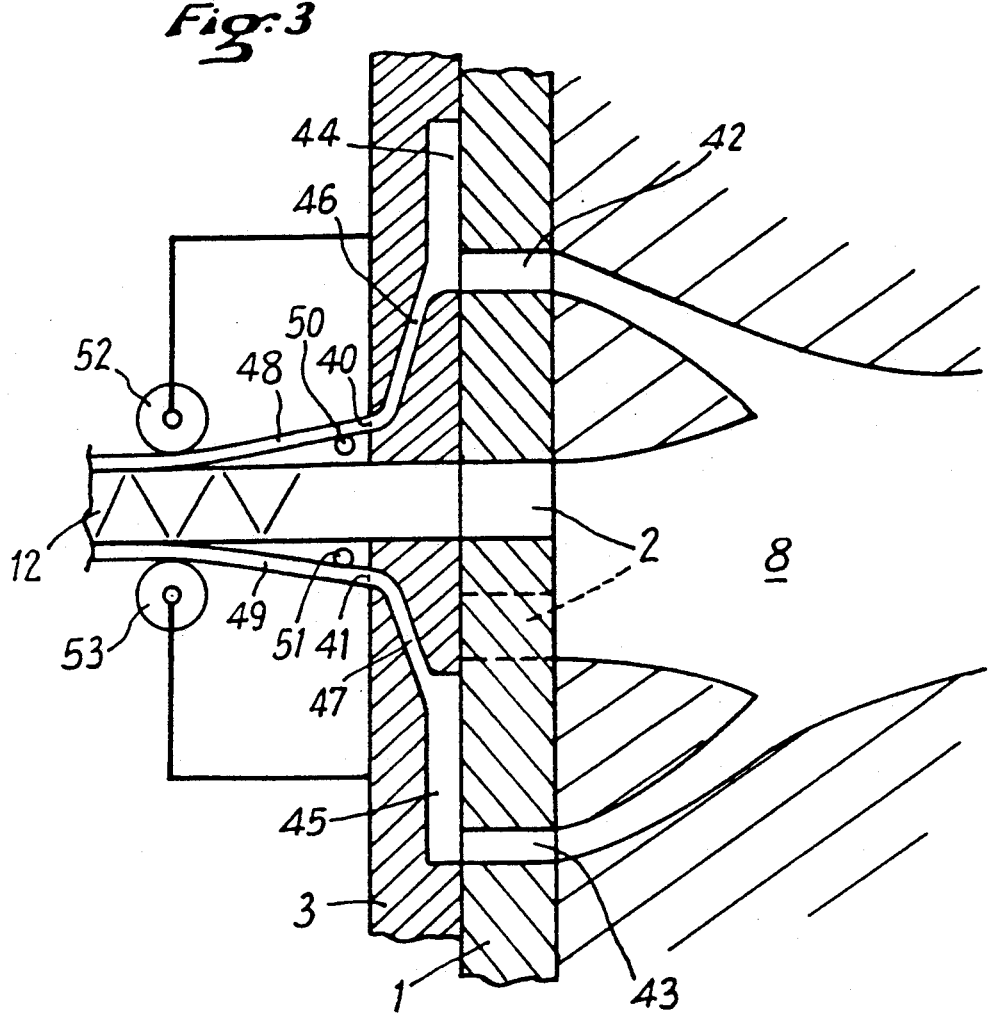
FIG. 3 is a diagrammatic view similar to FIG. 2 of a variant embodiment of the invention enabling two facing plates to be co-extruded with the cellular structure.

FIG. 3 shows the above-described items with the same references. In addition to the window 3a, the mask 3 has two slots 40 and 41 which extend parallel to the window 3a and which are situated on either side thereof. A flat strip of substance is continuously extruded through these slots since the inner chamber 8 communicates with chambers 44 and 45 provided in the mask 3 via openings 42 and 43 through the wall 1 of the die. The chambers are of a height such that regardless of the position of the mask 3, the openings 42 and 43 open out into respective ones thereof, and also such that they never overlap the main opening 2 through the die which co-operates with the window 3a. Internal ducts 46 and 47 connect respective ones of the chambers 44 and 45 to the slots 40 and 41. The slots 40 and 41 are far enough away from the window 3a to ensure that a space is left between the flat strips 48 and 49 of extruded substance and the cellular structure 12, thereby leaving room for booms 50 and 51 through which a cooling fluid is caused to flow to initiate solidification. The strips 48 and 49 are then pressed while still semisolid against respective sides of the structure 12 by rolls 52 and 53 which are fixed to the mask 3. This figure does not show the means used for final product hardening downstream from the rolls 52 and 53.

The strips 48 and 49 may be made of a substance which is different from that used for the core 12. In this case, the orifices 42 and 43 are connected to a different extruder chamber receiving said different substance.

It may also be advantageous to provide a fixed table beyond the draw rolls 14 over which the bottom face of the product slides while a head is disposed above the product to fill its cells with an expansible filler substance. Beyond this head, the device may include an upper fixed table facing the said table and defining a tunnel therewith (which tunnel may be heating or otherwise), the tunnel serving to contain the expansion of the substance being shaped. This automatically produces a rigid cellular plant filled with a filler material for the purposes of sound and heat insulation or for sealing.

In order to have a simple device which does not require complex servo-control in order to provide instantaneous regulation of the extruder throughput, it is advantageous to ensure that the area of the substance-passing section 2 through the wall 1 as uncovered by the window 3a of the mask 3 remains constant regardless of the position of the window relative to the wall. Thus, for a section 2 similar to that shown in FIG. 1, and for a window of height l equal to the height of each of the bottom, middle, and top portions of the section 2, it is necessary for the section of each slot 2c to be equal to one half of the section of each slot 2a or 2b, with the number of slots 2a being equal to the number of slots 2b and to one half the number of slots 2c as uncovered by the window, and for each of these portions to vary identically in section as a function of height.

When the pattern of the section 2 does not satisfy this requirement, facing orifices may be provided in the die and in the mask together with a shutter for the orifice through the mask, with the position of the shutter being controlled relative to the section 2 in such a manner as to provide a variable overflow, in order to compensate for variations in the throughput through the window 3a. The orifice provided through the wall 1 of the die should be long enough to ensure that the chamber 8 is always in communication with the orifice provided through the mask (as shown at 15 in FIG. 4).

FIG. 4 is a diagram of a variant embodiment of an extruder in accordance with the invention in which the mask 3 includes means for adjusting the height l of the window, and consequently for enabling the manufacture of cellular walls of different fixed thicknesses or of a cellular wall of variable thickness, using the same tooling throughout.

To do this, the moving mask 3 is made up of several portions, namely a support portion 16 including two parallel top guides 16a and 16b and two parallel bottom guides 17a and 17b with the guides 16a and 16b converging symmetrically towards the guides 17a and 17b about the horizontal. These guides slidably receive a part comprising two portions 18a and 18b capable of sliding vertically relative to each other and having facing edges 19a and 19b which constitute the parallel longitudinal edges of the window through the mask. The transverse edges 20a and 20b of the window are constituted by extensions from the above-mentioned portions 18a and 18b cooperating with a guidance portion for guiding their relative back and forth motion. This diagram shows clearly that if the parts 18a and 18b are moved in the direction of arrow A, they move towards each other and the width of the window is reduced. The width of the window is increased by moving the parts in the opposite direction B. The orifice 15 through the die wall and the section 2 is overlapped by the parts 18a and 18b over its entire length, regardless of the position of the mask in its stroke, except for a zone which corresponds to the intersection of said orifice 15 with an opening 21 provided in the portion 18b. This opening is of such a shape (in this case substantially triangular) that the zone of the orifice 15 which it leaves uncovered is of an area which varies depending on the location in which the portions 18a and 18b are disposed relative to the guides 16a, 16b, 17a, and 17b. It can thus be seen that the drop in throughput of extruded substance between the edges 19a and 19b as they move towards each other can be compensated. Since the edges 19a and 19b move towards each other as a result of the portions 18a and 18b moving in the direction of arrow A, the area of the orifice 15 which is uncovered by the opening 21 is increased. By suitably establishing the shape of the opening 21 as a function of the width of the orifice 15 and of the shape of the section 2, it is possible to ensure that the sum of the throughputs of the substance passing through the orifice 21 remains constant and that the variation in throughput through the window can be compensated by inverse throughput variations through the opening 21.

Naturally, this compensation can be achieved by other means, for example by servo-controlling the speed, frequency, or rate of the means for thrusting the substance through the extruder as a function of the width of the window.

FIG. 5 is a sketch showing a special portion of the extrusion section 2 as seen through the window 3a of the mask 3. This portion includes an annular opening 22 communicating with the slots 2c, with the inside wall portion 23 of this annular opening being held in place by any conventional means as shown diagrammatically at 24 connecting it to other portions of the wall, as explained above. In this figure, window 3a is shown in its top position at a maximum stroke value C, with the dot-dashed line 25 showing the position occupied by the top edge of the opening 3a when in its bottom position. It can be seen that under these conditions, the central zone of the extrusion section 2 including the annular opening 22 remains permanently uncovered. As a result a tube is extruded which follows an undulating path across the thickness of the cellular plate between its top and bottom faces. The plate may thus include a plurality of tubes extending longitudinally therethrough, which tubes may advantageously constitute ducts for the flow of a gas or a fluid, in particular a heat-transfer fluid.

It is naturally possible to extrude an elongate element of any solid or hollow section which may be required to reinforce the cellular plate.

It is also possible, in this central zone of the die which is always uncovered, to pay out a solid or hollow reinforcing member through the wall of the die at the same speed as the substance is extruded. This reinforcing member is made of different material from the plate and it may be flexible or rigid or under tension. Thus, if it is flexible it will accept the above-mentioned undulations, and subsequent tensioning will give the structure a corrugated aspect. In contrast, if it is prestressed, the plate will immediately take up a corrugated shape about the reinforcement. Finally, it may be observed that the "reinforcement" may be constituted by electric wiring.

Figure 6:
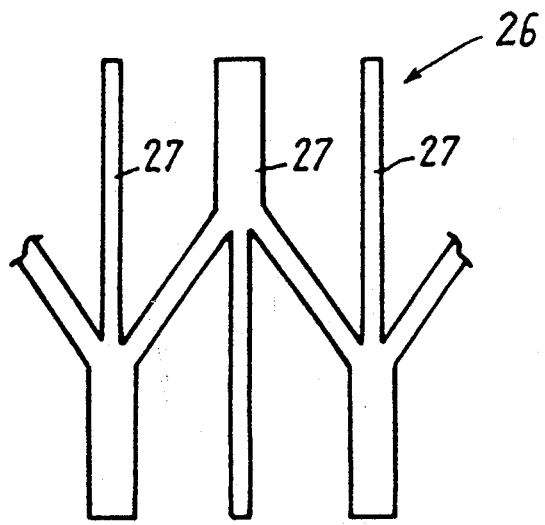
FIG. 6 is a fragmentary front view of a die for extruding a cellular structure having longitudinal partitions.

FIG. 6 is a fragmentary view of a particularly advantageous variant 26 of the die section 2. This pattern for the substance outlet section provides a cellular structure in which the cells are provided between parallel longitudinal partitions 27. This structure is suitable for panels which are subjected to compression or to bending in the longitudinal direction since the parallel partitions work in compression for their bottom fibers and in traction for their outer fibers like beams in a triangulated structure.

Finally, FIG. 7 is a perspective view of the portion of a cellular tube or plate 30 obtained using a device in accordance with the invention and having an extrusion die similar to that shown in FIG. 1B or 1C. It can be seen that each cell such as 31 is delimited by six partitions, including two longitudinal partitions 31a and 31b which are parallel to each other and perpendicular to the bottom and top surfaces of the plate. These partitions are also parallel to the extrusion direction A. The other four partitions 31c & 31d, and 31e & 31f extend transversely at a slope relative to the partitions 31a and 31b, and thus at a slope to the direction A. In addition, they slope relative to a perpendicular to the thickness of the plate or the tube (i.e. to a normal to the outer surface of the tube). Thus, a cell in the form of a polyhedron having a large bottom base and a small top base, is adjacent to two other identical cells on the same transverse line through the product via its partitions 31a and 31b, and is adjacent to four other cells the other way up via its other partitions. The structure defined in this way is close to a honeycomb structure and possesses the same characteristics. In addition, by virtue of the sloping partitions in each cell, this structure has considerably better performance than conventional honeycomb structures when subjected to shear (relative displacement between the top and bottom surfaces). The partitions constitute buttresses against such displacement in any direction, unlike a conventional honeycomb structure in which all of the partitions are perpendicular to the faces of the panel containing them.

Numerous variants of an extrusion device in accordance with the invention are possible. Without going into detail, the following may be mentioned.

Firstly, in the examples described, the plane in which the mask slides over the die has been shown as being perpendicular to the direction of substance extrusion. This plane may be at a slope relative to said direction. As a result the cells are asymmetrical in the extrusion direction. More precisely, if the plane is sloped forwardly and downwardly relative to the extrusion direction, a product as shown in FIG. 7 would have partitions 31c and 31d in each cell close to the vertical and of reduced length whereas its partitions 31e and 31f would be considerably elongated and nearly horizontal. The product would then be somewhat anisotropic, and in some applications this may be advantageous.

Another variant embodiment consists in providing the mask 3 as a plurality of portions which are independently movable relative to the die. For example, and in order to illustrate one possible variant, the mask shown in FIG. 1B could be split into three portions: a fixed central portion permanently uncovering the central slots 2c; and two moving portions on either side of the central portion. The speeds at which the outer portions are moved could be different from each other, thereby obtaining two cellular plates having different mesh sizes and interconnected by a narrow central portion which could act as a longitudinal hinge between two plates, or as a link portion which is easily split or detached.

In another variant embodiment applicable to manufacturing a tubular wall, the annular mask may have an annular window which is split up by solid mask sectors. If the motion of the mask is merely eccentric sliding, the resulting product will comprise walls constituting portions of a cylinder and having longitudinal edges extending parallel to the extrusion axis. However, the motion of the mask may include rotation about its axis, in which case the edges of the extruded cylinder portions would be helical. A tubular wall may be extruded through a plane which is inclined relative to the direction of extrusion. The resulting product has cell geometry similar to that described above, and is elliptical in section.

Further, as described with reference to FIG. 3 for a plane wall, it is possible to co-extrude skin-forming plates, i.e. it is possible to co-extrude tubular skins for the tubular cellular wall. In particular, the inside of the tube may be covered by providing for a pre-form to be extruded inside the cellular wall and to be pressed thereagainst by a gas blast.

Finally, it may be observed that it is advantageous in a variant of the FIG. 5 embodiment to increase the stroke C of the mask so that it intersects the tube of section 22. This provides communication between the tube and each cell. The resulting product is then a product in which the flow of a fluid can take place via such communication (drainage). The cells still do not communicate in a direction transversal to the extrusion direction. Naturally, the relative movement between the mask and the die could be provided by having a moving die behind a fixed mask.

The three-dimensional cellular product in accordance with the invention has numerous applications. It may naturally be used as a core for panels, tubes, or walls; however it may also be used as a slatted floor, as a reinforcement for various agricultural applications, for filtering, and for drainage. It may also constitute a support for heat and sound insulating materials.

It has numerous qualities for use in the construction industry, in transportation industry, or in much more technical applications, in particular when it includes reinforcement, or tubes, or is extruded using high quality materials, or using associations of materials having different characteristics (co-extrusion).

In this context, the invention is not limited to extruding thermo-plastic or thermo-hardenable material (reinforced or otherwise). It is applicable to any other substance which hardens rapidly under the effect of the suitable external agent (cold, radiation, heat, . . . ). It is also applicable to alloys, and in particular to certain kinds of thixotropic alloys in which it is possible to obtain a semisolid state close to the solidification point.

Finally, other suitable materials include clay, and food compositions such as pasta or biscuit mix.

What is claimed is:

1. A three-dimensional cellular wall produced by extrusion, limited by two parallel faces and having a plurality of cells delimited by partition walls extending between the two faces, said faces being parallel to the direction of extrusion;
   wherein at least a front and a rear part of each cell, with respect to the direction of extrusion are each delimited by two convergent partition walls, each partition wall of said front and rear parts sloping relative to said extrusion direction and sloping relative to a direction normal to said faces.

2. A three-dimensional cellular wall according to claim 1, wherein each cell comprises a central part delimited by two parallel partition walls joining the convergent partition walls of the front part, said two parallel partition walls extending parallel to the direction of extrusion and in a direction normal to said faces.

3. A three-dimensional cellular wall according to claim 1, wherein cells extending along at least one longitudinal axis of the wall are divided into two semi-cells by a continuous partition wall extending parallel to the direction of extrusion and in a direction normal to said faces.

4. A three-dimensional cellular wall according to claim 1, wherein said wall is in the form of a tube.

5. A three-dimensional cellular wall according to claim 1, wherein said wall is in the form of a plate.

6. A three-dimensional cellular wall according to claim 1, wherein continuous structural elements extend in the thickness of the cellular wall parallel to the direction of extrusion.

7. A three-dimensional cellular wall according to claim 6, wherein said continuous elements are tubular in section.

8. A three-dimensional cellular wall, according to claim 6, wherein said continuous elements are solid in section.

9. A three-dimensional cellular wall produced by an extruding process which comprises:
providing a first die member having a substance passing opening, said opening comprising a slot in the form of a broken line defining vertices between successive slot segments, with two adjacent vertices being respectively located on two parallel lines spaced apart at a first distance;
providing a second die member substantially parallel to the first die member, said second die member including a window, said window including two parallel edges spaced apart at a second distance, with the second distance equal to the thickness of the cellular structure to be formed, said second distance less than said first distance;
providing controlled cyclical relative movement between the die members such that the window scans the slot opening reciprocably between the lines of the vertices during extruding, thereby successively extruding front and rear parts of a cell of the three dimensional wall for each cycle of the cyclical relative movement, with each of the front and rear parts including two convergent partition walls which slope relative to the extrusion direction and which also slope relative to a direction normal to faces of the cellular wall.

10. A three-dimensional cellular wall according to claim 9, in which said first die member is provided with slot segments disposed at respective vertices of said broken line slot substance opening, in which cyclical relative movement between the die members is controlled such that the window scans the slot opening over its entire width, including segments, wherein each cell includes a central part joining said front and rear parts parallel to the direction of extrusion.

11. A three-dimensional cellular wall according to claim 9, in which said first die member is provided with additional slot segments extending between the two lines of vertices, wherein each cell is divided by at least a continuous partition wall parallel to the direction of extrusion.

12. A three-dimensional cellular wall according to claim 9, wherein said wall is in the form of a tube.

13. A three-dimensional cellular wall according to claim 9, wherein said wall is in the form of a plate.

14. A three-dimensional cellular wall according to claim 9, in which said first die member is provided with at least one orifice communicating with said slots and in which cyclical relative movement between the die members is controlled in such a manner that said orifice is within the window regardless of the position of the window, wherein a continuous structural element having a cross-sectional equal to the section of said orifice extends along the longitudinal dimension of the wall which is parallel to the extrusion direction.

15. A three-dimensional cellular wall according to claim 14 wherein said continuous element is tubular in section.

16. A three-dimensional cellular wall according to claim 14 wherein said continuous element is solid in section.

* * * * *